United States Patent Office 3,294,852
Patented Dec. 27, 1966

3,294,852
PROCESS FOR PREPARING FLUORINE CONTAINING ORGANIC COMPOUNDS
Martino Vecchio, Italo Cammarata, and Luciano Lodi, Milan, Italy, assignors, by mesne assignments, to Edison, Milan, Italy, a corporation of Italy
No Drawing. Filed July 11, 1963, Ser. No. 294,250
4 Claims. (Cl. 260—653.7)

The present invention relates to a continuous process for the production of fluorine containing organic compounds, and in particular chlorofluorinated compounds that are obtained by reacting methane, chlorine and hydrogen fluoride in the presence of other organic compounds and of a solid catalyst.

Numerous processes are known in the art for the production of fluorinated and chlorofluorinated organic compounds. Among the known processes are those in which the reactions are carried out utilizing either a liquid phase or vapour phase technique. Where the liquid phase technique is used, the reaction is effected by boiling a mixture of hydrofluoric acid and a halogenated organic compound in the presence of antimony halides with a reflux under pressure.

In the vapour phase method a vaporized mixture of hydrogen fluoride and a halogenated organic compound is passed over catalysts which are usually based on aluminum, chromium, zirconium, thorium, etc. fluorides. These known techniques use as raw materials halogenated organic compounds, for example, carbon tetrachloride, chloroform, perchloroethylene, etc., produced by thermal chlorination of hydrocarbons.

According to another process it is possible to obtain fluorinated organic derivatives by allowing a mixture of hydrogen fluoride, chlorine and methane to pass over a catalyst of chromium fluoride. This process, although utilizing very inexpensive starting materials has the disadvantage of being extremely slow and according to the output per unit of catalyst is extremely small.

Another known process of preparing fluorinated and chlorofluorinated organic compounds comprises reacting hydrogen fluoride, chlorine and methane in the presence of a catalyst and a mixture of continuously recycled hydrocarbons. This process while providing high yields and a rapid reaction time suffers from the disadvantages of requiring catalysts which exhibit a relatively short life, requiring frequent reactivations and periodic renewals thus altering the continuity of the process.

In accordance with the present invention a process is provided for the preparation of fluorinated and chlorofluorinated organic compounds, which does not require frequent catalyst regeneration or replacement of the catalyst mass. Not the least of the advantages of this invention is the provision of a process which requires an extremely reduced catalytic contact time so that the output of the whole process is increased.

Broadly, the process of this invention comprises successively passing a mixture of chlorine, hydrogen fluoride and methane together with one or more halogenated hydrocarbons through two catalytic reaction zones, one of said zones being maintained at a higher temperature than the other of said zones. More specifically, the process comprises passing the reactants through two catalytic zones while maintaining the temperature in one zone in the range of between about 350° and 500° C. while the other zone is maintained in the temperature range of between about 200° and 350° C.

The process of this invention may be advantageously carried out utilizing either catalyst zone as the initial reaction zone of the process; however, in the preferred embodiment the reactants are initially passed through the catalytic zone maintained in the higher temperature range and subsequently through the lower maintained temperature zone.

It was discovered that the reaction zone operating in the higher temperature range favors the chlorination reaction, while the lower temperature zone is conducive to the fluorination reaction. Any suitable chlorination catalyst may be used in the higher temperature zone which does not interact with the reaction products such as, for example, those which promote chlorination by selective adsorption of chlorine or promote chlorination by acting as a halogen carrier. By way of specific example of catalysts utilized advantageously in the high temperature zone of this invention are activated carbons, metallic halides and mixtures thereof, and solid inert materials such as metals or alloys which are not attacked by the reactants. This latter inert material may be in the form of shavings, filings, chips and the like. In the preferred embodiment, the catalyst used in the high temperature zone comprises activated carbons, derived from peat carbons, animal carbons and vegetable carbons.

Among the catalysts which have been advantageously used in the lower temperature reaction zone are supported and non-supported metallic oxides, salts and mixtures thereof. Particularly suitable are metal halides. By way of specific example of catalysts advantageously used in the lower temperature reaction zone of this invention are chromium fluorides, cobalt fluorides, nickel fluorides, aluminum fluorides, thorium fluorides; activated and fluorinated aluminas alone or impregnated with oxides or fluorides of chromium, nickel, cobalt, thorium, and aluminum; and activated carbons impregnated with chromium, cobalt, nickel, aluminum, thorium, zirconium, palladium fluorides or with mixtures of rare earth fluorides.

Depending upon the nature of the catalyst used, the catalyst operating in either the first or second reaction zones may be activated, if desired, prior to use by a heat treatment at temperatures between 200° C. and 700° C., but preferably between 300° and 500° C. in the presence of air or of an inert gas, for example, nitrogen. The catalysts may also be activated by a treatment with hydrofluoric acid and occasionally with chlorine at a temperature in the range of about 200° and 600° C.

As mentioned hereinbefore, the temperature af the higher temperature reaction zone is maintained in the range of between about 350° and 500° C., while the temperature of the other zone is maintained in the range of between about 200° and about 350° C. In the preferred embodiment the higher temperature zone is maitained in the range of between about 440° and 480° C.

The preferred temperature for the operation of the lower temperature range reaction zone varies with the extent of use of the catalyst, that is, it is preferred, when the catalyst has been freshly prepared, to utilize temperatures in the range of between 200° C. and 250°, gradually increasing the temperatures to a range of about 300° to 350° C. over a period of time.

As mentioned hereinbefore, a gaseous recycling mixture which comprises one or more organic fluorinated or chlorofluorinated compounds is passed with the reactants through the catalytic reaction zone. Intermediate compounds, byproducts and the product per se formed in the process of the invention, are advantageously used in the process of this invention. By way of example of suitable halogenated hydrocarbons are $CCl_4$; $CHCl_3$; $CH_2Cl_2$; $CH_3Cl$; $CFCl_3$; $CF_2Cl_2$; $CF_3Cl$; $CHFCl_2$; $CHF_2Cl$; $C_2Cl_4$; $C_2Cl_6$; and $C_2HCl_3$. These halogenated hydrocarbons are unaltered during the process and thus may be recovered and continuously recycled.

It is desirable to stabilize the temperature ranges of the reaction zones, this is, for any given run the temperatures be maintained relatively constant. To effect such stabilization any of the well known thermal control systems may be used, for example, a heat exchanger capable of regulating the temperature of the gases, which pass from one reaction zone to the other.

The contact time in the first as well as in the second zone may vary widely, considering that an increase of this parameter leads to the formation of more halogenated compounds. Preferably, it is operated with a total contact time less than 15 seconds in both zones; the preferred resting time in the catalysis zone of higher temperature lies below 8 seconds e.g. within the range of 1 and 2.5 seconds, while the preferred contact time for lower temperature catalysis zone lies below 7 seconds, e.g. within the range of 1 and 2 seconds.

The following examples are illustrative of but a few of the specific applications of the inventive concept of the invention, accordingly are not to be considered as limitations of the scope thereof.

*Example 1*

Into a metal reactor first zone containing 240 cc. of an activated carbon catalyst having a granulometry comprised between 35 and 36 mesh, supported on a porous metal plate, a gaseous mixture of chlorine, hydrogen fluoride, methane and a gaseous mixture of halogenated recycling hydrocarbons were introduced. The starting materials were present in the following molar ratios:

| | |
|---|---|
| Chlorine | 3.9 |
| Hydrogen fluoride | 1.6 |
| Methane | 1 |
| Recycling mixture | 6 |

The recycling mixture had the following composition by weight:

| | Percent |
|---|---|
| $CCl_4$ | 42.43 |
| $CFCl_3$ | 53.11 |
| $CHFCl_2$ | 0.22 |
| $CH_2Cl_2$ | 0.17 |
| $CHCl_3$ | 0.85 |
| $C_2Cl_4$ | 2.48 |
| $C_2Cl_6$ | 0.70 |

The temperature of the reactor was maintained at 470° C. The resting time of the gases in the first catalysis zone was of 1.5 seconds.

The gaseous mixture from the first zone was then introduced into a second metal reactor containing 118 cc. of a granular fluorinated alumina catalyst (between about 100 and 115 mesh). The temperature of this second reactor was maintained at about 230° C. The resting time of the gases in this zone was 1 second. On leaving the second reactor the gaseous mixture was conveyed to a stripping column, where the separation of the recycling mixture from the main products and by-products took place. The recycling mixture was then directly recycled into the first reaction zone. The products were washed with an aqueous solution of sodium hydroxide condensed and analysed by the gas-chomatographic method.

The conversions thereby obtained were as follows:

| | Percent |
|---|---|
| $CH_4$ | 99.3 |
| HF | 98.8 |
| $Cl_2$ | 97.5 |

The yields of the desired chlorofluorinated products calculated on the basis of converted methane were as follows:

| | Percent |
|---|---|
| $CF_3Cl$ | 1.8 |
| $CF_2Cl_2$ | 60.8 |
| $CFCl_3$ | 37.1 |

The process was continuously carried out for about 1000 hrs., during which time the catalysis did not show any appreciable reduction of activity.

*Example 2*

Utilizing the equipment of the preceding example, a gaseous mixture of chlorine, hydrogen fluoride, methane and a recycling mixture was fed firstly in the lower temperature zone. The initial ingredients were present in the following molar ratios:

| | |
|---|---|
| Chlorine | 3.82 |
| Hydrogen fluoride | 1.71 |
| Methane | 1 |
| Recycling mixture | 6 |

The recycling mixture had the following composition by weight:

| | Percent |
|---|---|
| $CCl_4$ | 56.23 |
| $CFCl_3$ | 40.25 |
| $CHFCl_2$ | 0.19 |
| $CH_2Cl_2$ | 0.09 |
| $CHCl_3$ | 0.82 |
| $C_2Cl_4$ | 2.24 |
| $C_2Cl_6$ | 0.52 |

The catalyst used in the first zone was fluorinated alumina and this first zone was maintained at a temperature of 230° C. The gaseous ingredients from the first zone were then fed into the second reaction zone containing activated carbon catalyst and maintained at a temperature of 470° C.

In this run the conversions were as follows:

| | Percent |
|---|---|
| $CH_4$ | 100 |
| HF | 99.2 |
| $Cl_2$ | 97 |

The net yields of the desired chlorofluorinated products, calculated on converted methane were as follows:

| | Percent |
|---|---|
| $CF_3Cl$ | 3.6 |
| $CF_2Cl_2$ | 75.1 |
| $CFCl_3$ | 21.3 |

*Example 3*

Equipment similar to that of the preceding examples and consisting of a first reactor containing 240 cc. of active carbon (granulometry of 35–60 mesh) maintained at 470° C., and of a second reactor containing 118 cc. of fluorinated alumina impregnated with thorium fluoride (granulometry 100–115 mesh) maintained at 240° C. was used. Into the first reactor was introduced a mixture containing chlorine, hydrogen fluoride, methane, and a recycling mixture having the following molar ratios:

| | |
|---|---|
| Chlorine | 3.9 |
| Hydrogen fluoride | 1.44 |
| Methane | 1 |
| Recycling mixture | 6 |

The recycling mixture had the following composition in percentage by weight:

| | Percent |
|---|---|
| $CCl_4$ | 40.26 |
| $CF_2Cl_2$ | 0.13 |
| $CFCl_3$ | 53.52 |
| $CHFCl_2$ | 0.02 |
| $CH_2Cl_2$ | 0.06 |
| $CHCl_3$ | 0.74 |
| $C_2Cl_4$ | 4.12 |
| $C_2Cl_6$ | 1.06 |

The resting time of such gases in the first reactor was 1.5 seconds, after which the gases were transferred to the second reactor, where they remained for one second. The recycling mixture of the above quoted composition was then removed from the finished reaction products by partial condensation. The resulting product was as follows:

| | Percent |
|---|---|
| CF₃Cl net yield on the converted methane | 0.66 |
| CF₂Cl₂ net yield on the converted methane | 54.52 |
| CFCl₃ net yield on the converted methane | 44.53 |

The conversions were the following:

| | Percent |
|---|---|
| CH₄ | 99 |
| Cl₂ | 96 |
| HF | 98 |

After 3500 hours of continuous operation the catalysts did not show any decrease of activity whatsoever.

We claim:

1. The method of preparing chloro-fluorinated methane comprising successively passing a mixture of hydrogen fluoride, chlorine and methane, together with a mixture of halogenated hydrocarbons selected from the group consisting of fluorinated, chlorinated, and chloro-fluorinated hydrocarbons having a maximum of two carbon atoms, through two reaction zones, one of said zones being maintained in the temperature range of 200°–350° C. and containing a catalyst selected from the group consisting of fluorides and oxides of a metal from the group of chromium, cobalt, nickel, aluminum, thorium fluorinated alumina; activated carbon impregnated with a metal fluoride from the group consisting of nickel, aluminum, thorium, zirconium, palladium and rare earth fluorides and mixtures thereof, and the other of said zones being maintained in the temperature range of about 350°–500° C. and containing activated carbon.

2. The method of claim 1 wherein said reaction mixture is first passed through the higher temperature catalysis zone where they remain for a time in the range of about 1 to 8 seconds.

3. The method of claim 1, wherein said reaction mixture is first passed through the lower temperature zone, where they remain for a time in the range of about 1 to 7 seconds.

4. The method of claim 1 wherein the catalyst in the lower temperature zone is fluorinated alumina.

References Cited by the Examiner

UNITED STATES PATENTS

| 2,407,129 | 9/1946 | Benning et al. | 260—653.7 |
| 2,946,827 | 7/1960 | Belf | 260—653.7 |

FOREIGN PATENTS

| 640,486 | 7/1950 | Great Britain. |

LEON ZITVER, *Primary Examiner.*

DANIEL D. HORWITZ, *Examiner.*